INVENTORS
Charles K. Pressler
John H. Weaver

Herschel C. Olmohundro
attorney

Dec. 18, 1956

C. K. PRESSLER ET AL 2,774,077

HEAT AND WEAR RESISTING MATERIAL AND ARTICLE FORMED THEREOF

Filed Oct. 15, 1953

INVENTORS
Charles K. Pressler
John H. Weaver
Herschel C. Omohundro

United States Patent Office 2,774,077
Patented Dec. 18, 1956

2,774,077

HEAT AND WEAR RESISTING MATERIAL AND ARTICLE FORMED THEREOF

Charles K. Pressler and John H. Weaver, Newark, Ohio

Application October 15, 1953, Serial No. 386,312

8 Claims. (Cl. 2—167)

This invention relates generally to heat insulating or resisting materials and is more particularly directed to such materials which are especially developed for use in gloves, mitts, pads and the like employed by firemen, fire fighters, and workmen in laboratories, glass and ceramic factories and other places to protect their hands, heads and bodies from excessive conductive and radiant heat.

Not infrequently in such places hot repair workmen are required to operate in regions exposed to very high temperatures and to handle objects heated to a high degree, one example being refractory materials used in repairing lehrs and furnaces in glass factories, where the repairs are made either during operations or shortly following operations and before the regions have had time to cool, it being particularly desirable and sometimes absolutely necessary to make the repairs quickly to keep the shut-down period as short as possible.

An object of this invention is to provide a heat insulating or resisting material of improved characteristics, particularly in the combination of resisting heat and wear due to actual contact with heated objects composed of abrasive material.

Another object is to provide a heat and wear resistant material which will be light in weight, resistant to the action and passage of corrosive chemicals and moisture and be suitable for the formation of articles of wearing apparel such as gloves, mitts and pads or guards.

A further object of the invention is to provide a heat and wear resistant material which will afford maximum resistance to the passage of heat and to abrasion and will retain oil and paint to make the material particularly suitable for use in mold and die swabs, mops, paint applicators and the like.

A still further object of the invention is to provide a heat and wear resistant material composed of high temperature resistant materials assembled in a novel manner to improve the efficiency thereof.

A still further object of the invention also is to provide a heat and wear resistant material having a base or body sheet or layer of heat resistant material and a chenille layer or covering carried by the base or body layer, the chenille layer also being formed of heat resistant material arranged, in certain instances, in a particular manner to improve the heat and wear resisting characteristics.

Another object of the invention is to provide a heat and wear resistant material of the type mentioned in the preceding paragraph having the base sheet formed of woven glass fibres and the chenille layer being formed of glass yarn, portions of the materials being treated with a heat resistant plastic material which improves the moisture passage resisting quality of the material and assists in retaining the materials in their assembled relationship.

Still another object of the invention is to provide a heat and wear resistant material having a base sheet of heat resisting fabric which supports a chenille covering formed of a combination of glass and other yarns, the glass yarn serving as heat insulating material and the other yarns serving as oil, paint and mold or die lubricant retaining material, the combination of the materials providing a substance which is particularly suitable for the formation of mold or die swabs and paint applicators used in applying liquids to heated molds and/or dies.

Another object of the invention is to provide a glove or similar article of wearing apparel formed of the heat and wear resisting material mentioned in the foregoing objects in combination with other materials whereby a safer, more efficient, longer wearing article is produced.

Further objects and advantages of the present invention will be apparent from the following description, reference being had to the accompanying drawings wherein a preferred form of embodiment of the invention is clearly shown.

Referring more particularly to the drawings, numeral 20 designates a piece of heat and wear resisting material formed in accordance with the present invention. This piece of material has a base sheet 21 which may be of any suitable material depending upon the particular use to which the articles formed therefrom are to be placed. If the articles are to be subjected to excessively high temperatures, it is preferable to form the backing or base sheet from woven glass fibres. It is within the concept of the invention to form this backing sheet of other materials and to impregnate this sheet with fire resistant or fireproofing compositions.

Figure 1:
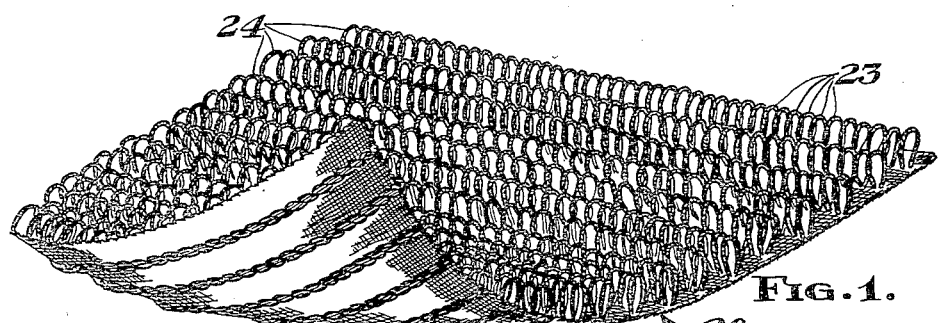
Fig. 1 is a perspective view of a piece of heat and wear resistant material formed in accordance with the present invention, the corner of the piece being turned back to show the reverse side.
Figure 2:
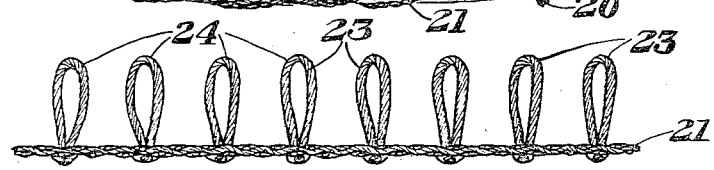
Fig. 2 is a vertical sectional view taken through the piece of material shown in Fig. 1, the section being taken transversely of the rows of chenille or piling forming a cover for the obverse side of the material.
Figure 3:
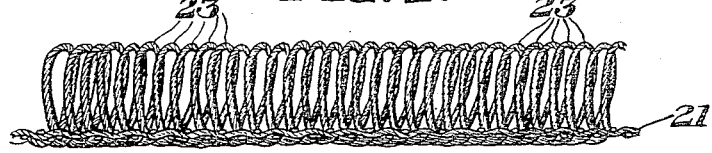
Fig. 3 is a similar view taken on a plane indicated by the section line III—III of Fig. 2 and extending parallel to a row of chenille or piling.
Figure 4:
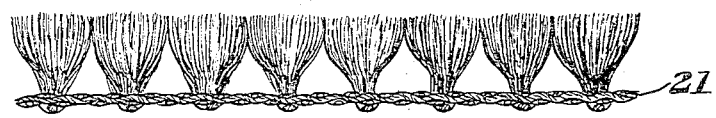
Fig. 4 is a view similar to Fig. 2, the loops of the piles being cut to provide separate ends and permit the filament forming the yarn to separate.

The base sheet is provided with a plurality of rows of piling sometimes referred to in the industry as chenille. This piling may be of the looped type as shown particularly in Figs. 1, 2, and 3 or of the cut type shown in Fig. 4. The looped type of piling, designated generally by the numeral 23, is preferably formed from loosely twisted glass yarn and the rows 24 are spaced a considerable distance from one another. However, the spacing of adjacent rows is less than the distance equal to the length of the pile. When the pile is cut, as shown in Fig. 4, the filaments making up the yarn spread widely and form a thicker cover for the base sheet.

The heat resisting quality of the material is not necessarily improved, however, by cutting the pile. The chenille or pile covering serves to provide an air space between the heated article and the base sheet so that more effective resistance will be offered to the transmission of heat than the base sheet alone would provide.

The wear resisting quality of the material is attributed to the fact that the pile provides a soft cover for the base sheet and will not offer enough resistance to the abrasive character of the articles handled to permit the glove or other wearing apparel formed of the material to wear. Its life is, therefore, greatly prolonged. The active life of the material is also increased by impregnating the base sheet and adjacent yarn fibres with a plastic material, one example, which has been found by test to be highly satisfactory, being silicone rubber or rubber-like compositions. By impregnating the yarn fibres and base sheet with such materials, the danger of the pile fabrics pulling out of the base sheet is eliminated. Resistance to heat and corrosive vapors, acids, and oils is also increased in that manner.

Figure 5:
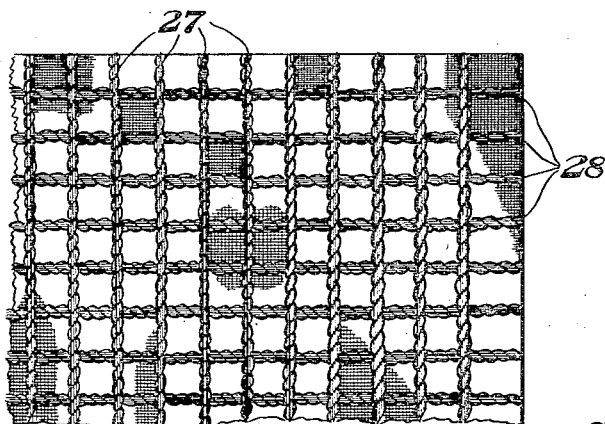
Fig. 5 is an elevational view of the reverse side of a piece of heat and wear resistant material of modified form.

The physical characteristics of the material may be varied to a great degree, the length of the pile, the attachment of the pile to the face of the backing sheet rather than extending it through the same, the spacing of the rows, the use of straight parallel rows or other patterns being a matter of choice and influenced to some degree by the thickness or diameter of the yarn employed and the uses to which the articles formed from the materials are to be placed. It has previously been suggested that different materials or combinations thereof may be employed. These materials, such as, glass, cotton, wool, mineral and synthetic fibers may be combined in the same yarn or yarns of the different materials may be used in alternate or spaced rows of piles. As shown in Fig. 5, the rows 27 and 28 of different yarns might be arranged to cross one another at any suitable angle. It has been found that, where the mitts, gloves, pads, etc. are used to apply oils, paints or the like to heated articles, better results may be secured by using yarns formed from a combination of materials such as glass and cotton or woolen fibers. The latter, of course, should be treated with some flameproofing material. The cotton or woolen yarns increase the oil retentive properties of the material; these properties may also be increased by applying a wetting agent to the glass yarn.

Actual tests of heat protective apparel and equipment in the form of mitts, pads and gloves constructed of glass yarn show that they will withstand temperatures of the order of 2600 degrees Fahrenheit. The glass yarn nap will also resist the passage of water and be mildew-proof, rot-proof, and verminproof. Because of the physical construction, the cut or looped pile material will form a multitude of air spaces which prevent the flow of heat through the material even when in direct contact with objects at high temperatures.

Figure 6:
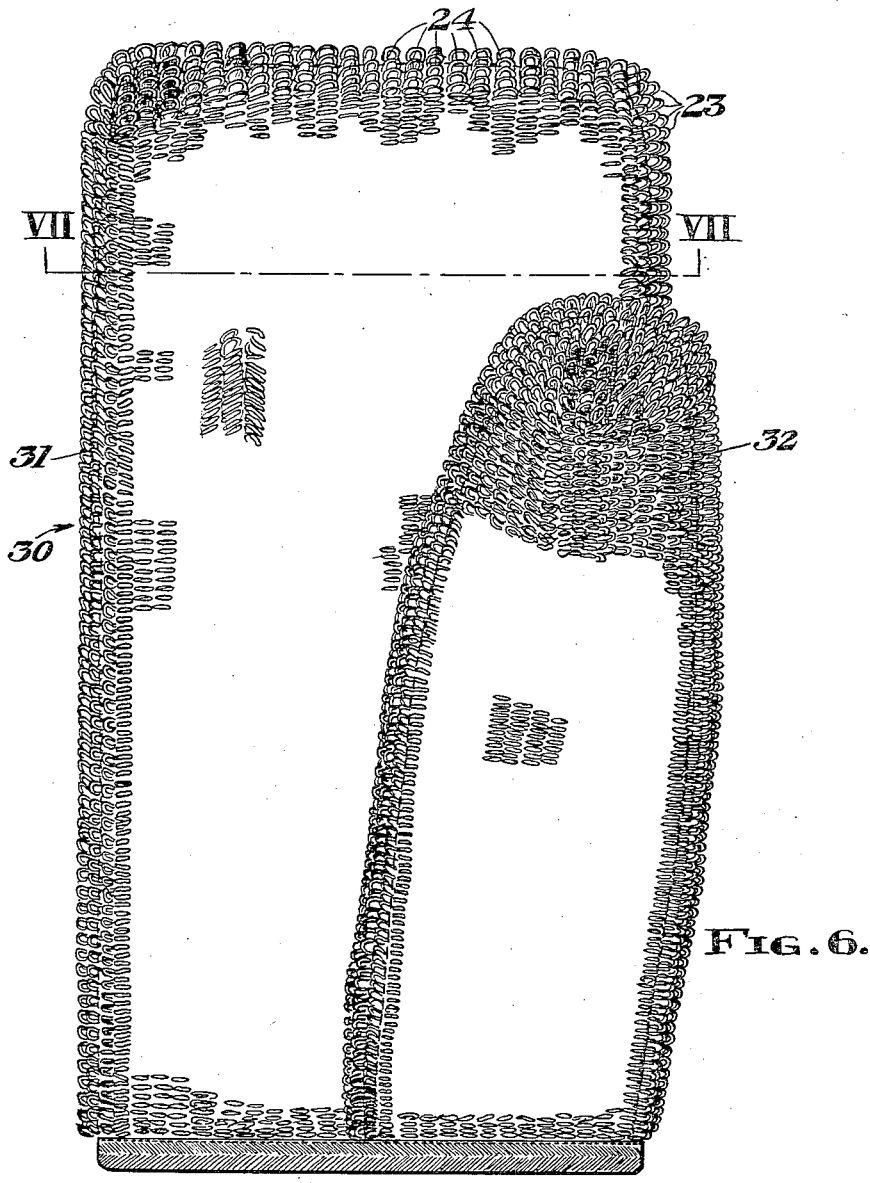
Fig. 6 is an elevational view of the palm side of a mitt incorporating some of the heat and wear resistant material forming the subject matter of the present invention.
Figure 7:
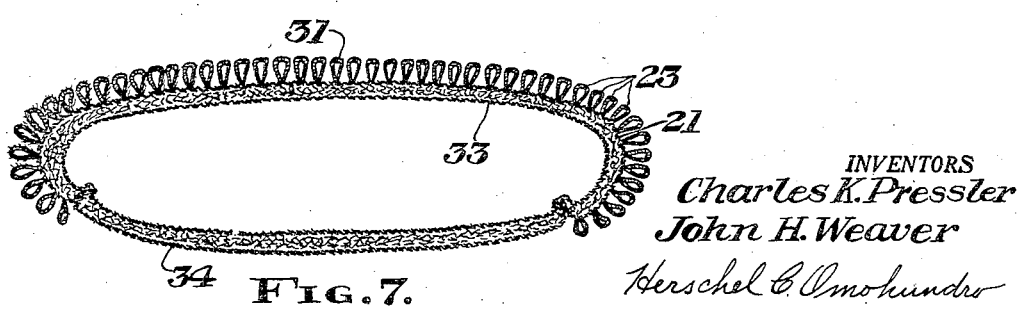
Fig. 7 is a sectional view of the mitt shown in Fig. 6 on the plane indicated by the line VII—VII.

Figs. 6 and 7 show a mitt formed of heat and wear resisting material embodying the features of the present invention. The mitt 30 has the palm 31 and thumb section 32 formed from a piece of heat and wear resisting material constructed in accordance with the invention. The base sheet 21 has a looped pile covering provided on the exterior or exposed side. The rows forming this pile covering are relatively widely spaced so that the resulting material has a high degree of flexibility and yet adjacent piles will overlap when the material is engaged with an object. This arrangement of piles prevents direct contact of the object with the base sheet and the maintenance of air spaces therebetween. The glass fiber yarn itself also constitutes a poor conductor of heat.

Between the base sheet and a flannel inner lining 33, the mitt has an insulating filler of fine loosely matted glass wool fibers. The inner lining may also be treated with a flameproofing compound. The glass wool filler also assists in resisting the transmission of heat by radiation and/or conduction.

The outer covering 34 of the back of the mitt is formed of woven glass cloth which has been aluminized to cause it to reflect radiant heat.

The heat and wear resistant materials formed in accordance with the present invention will give results far superior to conventional materials.

While the form of embodiment of the present invention as herein disclosed constitutes a preferred form, it is to be understood that other forms might be adopted, all coming within the scope of the claims which follow.

We claim:

1. An article of heat resisting wearing apparel comprising an inner casing shaped to receive a portion of the human anatomy; an outer casing substantially conforming to and carried by said inner casing, said outer casing having a base sheet of woven fibers; and a covering of chenille composed of glass fibre yarns on the outer side of said base sheet.

2. An article of heat resisting wearing apparel comprising an inner casing shaped to receive a portion of the human anatomy; an outer casing substantially conforming to and carried by said inner casing, said outer casing having a base sheet of woven fibers; a chenille-like covering of glass fibre yarns on the outer side of said base sheet; and a filler composed of loosely matted glass fibers between said casings.

3. An article of heat resisting wearing apparel comprising an inner casing shaped to receive a portion of the human anatomy; an outer casing carried by said inner casing, said outer casing having a base sheet of woven glass fibres; a chenille-like covering of glass fibre yarns on the outer side of said base sheet; and a filler composed of matted glass fibres between said casings.

4. An article of heat resisting wearing apparel comprising an inner casing shaped to receive a portion of the human anatomy; an outer casing provided on said inner casing, said outer casing having a base sheet of woven fibers; and a chenille-like body of glass and other fiber yarns looped through and projecting from the outer side of said base sheet.

5. In a heat and wear resisting mitten, a palm section, a thumb section and a back section, all of said sections being shaped and joined in mitten-forming relationship, said palm and thumb sections having an outer layer with a base sheet of woven glass fibers and relatively widely spaced rows of looped piles formed of loosely twisted glass yarn projecting from the outer side of said base sheet, the length of the piles being greater than the spacing between adjacent rows, the back section of said mitten having an outer layer of woven glass cloth treated with an aluminizing compound.

6. A heat and wear resisting mitten comprising a palm section, a thumb section and a back section, all of said sections being shaped and joined in mitten-forming relationship, said palm and thumb sections having an outer layer with a base sheet of woven glass fibers and relatively widely spaced rows of looped piles formed of loosely twisted glass yarn projecting from the outer side of said base sheet, the length of the piles being greater than the spacing between adjacent rows, the back section of said glove having an outer layer of woven glass cloth; a flannel inner lining in each of said palm, thumb and back sections, said inner linings being carried by their respective sections; and an insulating filler of relatively loosely matted glass wool fibers between the inner lining and the outer layers of said sections.

7. A heat and wear resisting mitten comprising palm, thumb and back sections joined to form the mitten, said sections having inner and outer layers, the outer layers of said sections having a base sheet of woven glass, the base sheets of said thumb and palm sections having spaced rows of piles formed of loosely twisted glass yarn successively looped through the base sheet, the loops being pulled taut on the inner side of the base sheets and left loose on the outer side to project from said base sheet a distance in excess of the spacing between adjacent rows; and a heat insulating filler between the inner and outer layers of each section.

8. A heat and wear resisting mitten comprising palm, thumb and back sections joined to form the mitten, said sections having inner and outer layers, the outer layers of said sections having a base sheet of woven glass; the base sheets of said thumb and palm sections having spaced rows of pile formed of loosely twisted glass yarn successively looped through the base sheet, the loops being pulled taut on the inner side of the base sheet and left loose on the outer side to project from said base sheet a distance in excess of the spacing between adjacent rows, the projecting loops on the outer side of said base sheet being cut to permit the filaments of the yarn to spread; and a heat insulating filler between the inner and outer layers of each section.

References Cited in the file of this patent

UNITED STATES PATENTS

| Number | Name | Date |
|---|---|---|
| 232,122 | Hammesfahr | Sept. 14, 1880 |
| 599,191 | Oehrle | Feb. 15, 1898 |
| 616,748 | Templeton | Dec. 27, 1898 |
| 2,339,747 | Pettorossi | Jan. 18, 1944 |
| 2,381,218 | Jacob | Aug. 7, 1945 |
| 2,428,591 | Slayter | Oct. 7, 1947 |
| 2,450,047 | Kloeckener | Sept. 28, 1948 |
| 2,607,042 | Schloss | Aug. 19, 1952 |
| 2,642,571 | Brown | June 23, 1953 |
| 2,656,586 | Cowie et al. | Oct. 27, 1953 |
| 2,660,736 | Biefeld | Dec. 1, 1953 |
| 2,703,774 | Morrison | Mar. 8, 1955 |